Patented Aug. 11, 1931 1,817,958

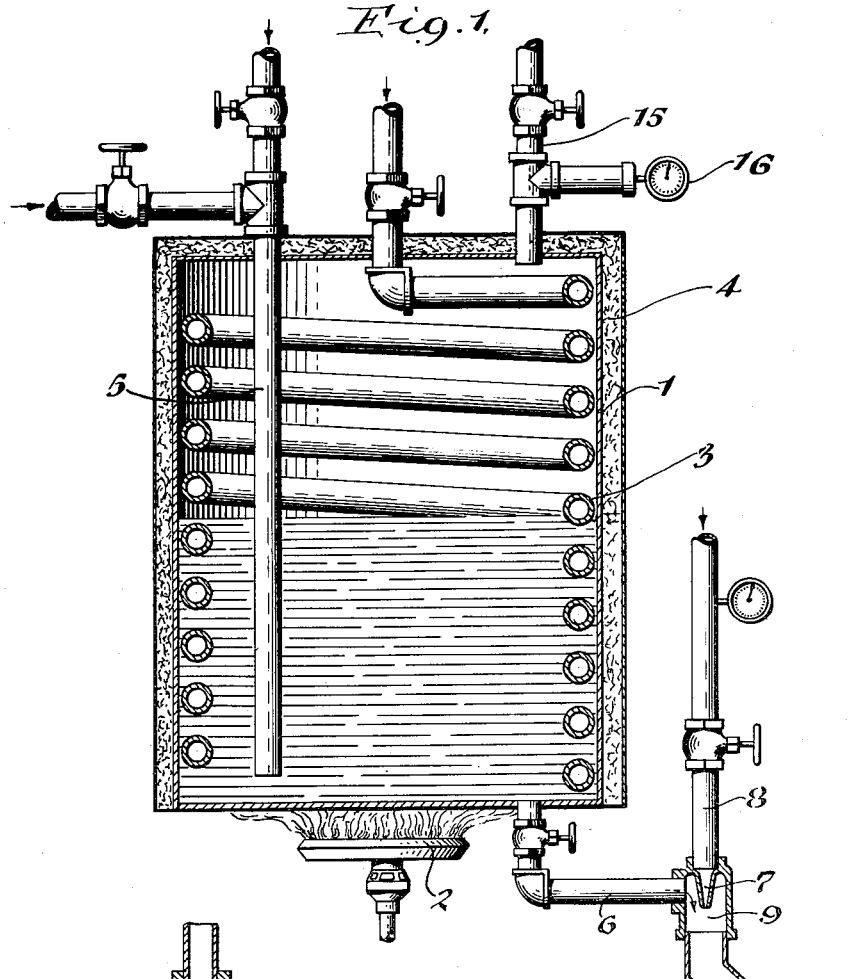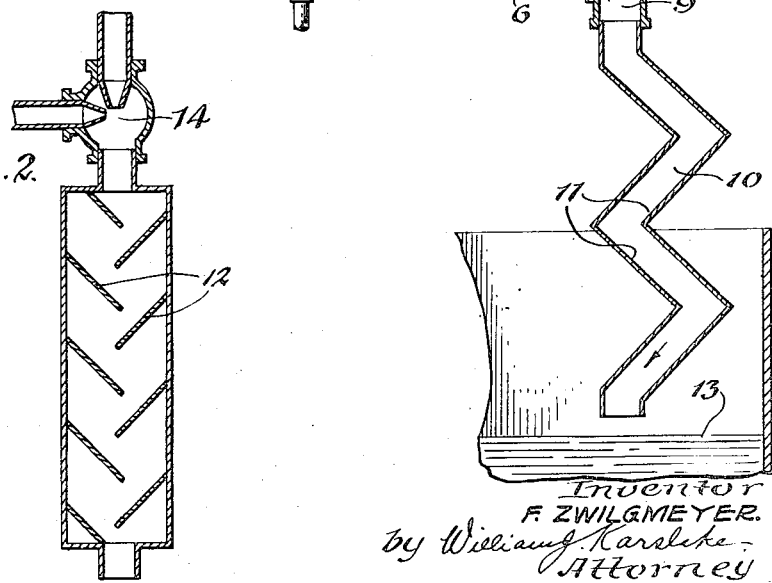

UNITED STATES PATENT OFFICE

FRITHJOF ZWILGMEYER, OF BUFFALO, NEW YORK, ASSIGNOR TO NATIONAL ANILINE & CHEMICAL COMPANY INC., OF NEW YORK, N. Y., A CORPORATION OF NEW YORK

DISPERSION

Application filed August 21, 1926. Serial No. 130,626.

This invention relates to the dispersion of aggregated systems and an apparatus therefor, and more particularly relates to the formation of liquid—liquid disperse systems or emulsions.

In effecting a chemical reaction between two or more reagents or substances wherein one or more of them are insoluble or immiscible in a solution of the others, the reaction is often facilitated and more easily brought about by adding the insoluble or immiscible reagent as an emulsion, or in a highly dispersed state in a liquid medium, to the remaining substances.

For example, in the production of dyestuffs by coupling a diazo compound into diphenylamine, the latter is usually present as an insoluble body. For instance, in the preparation of preparation of the dyestuff known as Metanil Yellow by coupling diphenylamine with diazotised metanilic acid, a common procedure consists in dissolving the diphenylamine in strong sulfuric acid and reprecipitating it in a finely divided state therefrom in the presence of diazotised metanilic acid. This procedure, however, introduces an adulterant which requires neutralization and has further deleterious effects on the coupling reaction. These disadvantages are avoided and the time cycle considerably reduced by liquefying the diphenylamine and forming an emulsion thereof with water and then contacting the emulsion with the diazotised metanilic acid.

According to the present invention, dispersion is accomplished by placing the materials in a container, preferably in admixture with a dispersing agent, where they are suitably agitated and causing them in the fluid state to flow from the container as a narrow stream, which is forced, preferably under elevated pressure, in a zigzag or sinuous course until dispersion is accomplished.

In the accompanying drawing, Fig. 1 is a diagrammatic sectional view of a modified form of a conductor in which the zigzag flow takes place.

The container 1, in which the materials to be dispersed are initially placed, is provided with a heating means such as a burner 2, beneath the bottom thereof, which may be supplemented or replaced by a heating coil 3 through which steam may be passed. One or more sides of the container may be heat insulated as shown. Stirring, for obtaining a uniform mixture of the materials, may be carried on by any suitable form of mechanical agitator; but in the smaller sizes of apparatus, particularly, air or steam directed into the mixture by a pipe 5 is found sufficient. Pressure may be exerted upon the charge by air, steam or any other suitable medium admitted through pipe 5 or through a valve controlled pipe 15, as may be desirable, and indicated by a gauge, for example, gauge 16.

The mixture is withdrawn in a narrow stream from the container through a valve controlled line 6. Extending across the outlet of this line is a jet 7 communicating with a valved line 8 feeding air, steam or any other suitable medium thereto. A chamber 9 encloses the jet and a sinuous conductor or pipe 10 leads from the chamber. The shape given the conductor presents a series of baffles 11 to the oncoming fluid. An equivalent arrangement is a straight conductor provided with baffles 12 on opposite sides of and inclined in the direction of flow toward a median plane as shown in Fig. 2; these are staggered sufficiently to form a continuous, sinuous passage. The baffles may lie in the same axial plane or in planes in angular relation to one another. The emerging dispersed system is directed as desired.

In the manufacture of azo dyestuffs derived from diphenylamine, for example, Metanil Yellow, the aggregated system in the container comprises molten diphenylamine to which water, together with a small percentage of soap and soda ash as emulsifiers or dispersing agents, is added as a dispersion medium. The mixture is agitated to obtain uniformity and is drawn through the line 6. Steam under pressure from the line 8 forces the mixture from the chamber 9 and impels it through the conductor or emulsifier 10, where, due to the repeated impingements or sharp collisions of the mixture against the baffles, it results in an emulsion. For example, a well agitated mixture at a temperature of about 65°–90° C., and comprised of about 510 parts by weight of molten diphenylamine, 14 parts sodium carbonate, 14 parts of potash soap and 170 parts water, will produce a satisfactory dispersion, i. e., an emulsion having a milky appearance, upon being forced at a rate of approximately 700 to 800 cc. per minute through a pipe 10, as shown, of about 12 to 14 inches in length, and one fourth inch in diameter, and having six sections disposed in zigzag fashion, the angle of intersection being about 120° C. Other emulsifying or dispersing agents than soap may be used, e. g., dextrine, glue, Turkey red oil, etc. Their presence aids in the formation of an emulsion chiefly by stabilizing it.

This emulsion is directed to the surface of a solution of a diazo body, such as diazotized metanilic acid, contained in an agitated vat 13 wherein the coupling takes place. Instead of a direct passage from the emulsifier 10 to the vat 13, the emulsion can be directed to an intermediate vat for cooling and then distributed to the vat 13.

Various other means may be substituted for the jet to cause sufficient impingement against the baffles. For instance, an atomizer 14 (Fig. 2) operated with air, steam or other suitable means, may be used to produce a spray that is further broken up and dispersed by impact upon the baffles.

While it is found preferable to charge a container with the reagent and the dispersion medium, so that their proportions may be definitely determined and their mixture, with or without the dispersing agent, made uniform before impelling the resulting mixture through the emulsifier, it is evident that the charge need not include the dispersion medium and the latter may be utilized as the impelling agent. In place of a jet, an atomizer or other impelling means, it is possible to apply sufficient pressure upon the mixture in the container as to impart a flow of its contents through the sinuous conductor at a velocity sufficient to give adequate impingement and the desired dispersion. Furthermore, the container may be omitted entirely, and the reagent and the dispersion medium, in admixture or separately, and with or without the presence of a dispersing agent, may be supplied to the sinuous conductor, with the interposition of a jet or atomizer if desired, either one or both being impelled by sufficient force to cause the required dispersion. When a reagent is normally a solid, as in the illustration given above, its emulsification is made possible by the application of heat, or other suitable means, to bring it into the liquid condition; and such a change in state can be caused to take place in a container, as shown, with or without the addition of the dispersion medium. Where heat is applied without the admixture of the dispersion medium, there should be a sufficient supply of heat to avoid solidification of the reagent during the process of dispersion; and heat may be supplied by the partial or complete vaporization of the dispersion medium, which may be used in that condition to impel or to atomize the liquefied solid.

I claim:

1. A process for dispersing a substance which comprises mixing the substance in a fluid state with a dispersing agent and a dispersion medium, and causing impingement of a narrow stream of the resulting mixture.

2. A process for dispersing a substance which is normally solid at ordinary temperature which comprises combining the substance in the melted state with a dispersion medium and passing the combination under pressure through a zigzag conduit so that the melted material and dispersion medium collide sharply with the conduit and unite to form a dispersed system.

3. A process for dispersing a substance which comprises causing an impingement of the substance in admixture with a dispersion medium, a dispersing agent and steam.

4. A process for dispersing a substance which comprises mixing the substance in a fluid state with a dispersion medium and an emulsifying agent, and passing the resulting mixture with steam through a sinuous conductor to cause impingement and produce a dispersed system.

5. A process for the emulsification of a diphenylamine which comprises mixing the molten diphenylamine with water and an emulsifying agent and passing the mixture in the fluid state under pressure in contact with steam through a sinuous conductor and in sharp collisions therewith.

6. A process for the emulsification of diphenylamine which comprises passing an admixture of diphenylamine, water, soap and sodium carbonate in contact with steam through a zigzag conduit.

7. A process for the emulsification of a diphenylamine which comprises emulsifying the diphenylamine body by causing its impingement in the liquid state in admixture with a dispersion medium.

8. A process for the emulsification of a diphenylamine which comprises emulsifying diphenylamine by causing its impingement in the liquid state in admixture with water and soft soap, and in contact with steam.

9. A process for dispersing a substance which comprises mixing the substance in a fluid state with a dispersion medium and a dispersing agent and passing the resulting mixture under pressure through a sinuous conductor to cause sharp collisions therewith.

10. A process for dispersing a substance which comprises passing an admixture containing the substance, a dispersion medium and a dipersing agent under pressure through a sinuous conductor to cause sharp collisions therewith.

In testimony whereof I affix my signature.

FRITHJOF ZWILGMEYER.